United States Patent
Kraft et al.

[15] 3,691,127
[45] Sept. 12, 1972

[54] FIRE RETARDANT VINYL CHLORIDE COPOLYMER LATICES

[72] Inventors: Paul Kraft, Spring Valley; Robert H. Brunner, Yonkers, both of N.Y.

[73] Assignee: Stauffer Chemical Company, New York, N.Y.

[22] Filed: Sept. 10, 1970

[21] Appl. No.: 71,231

[52] U.S. Cl. ..............260/29.6 T, 260/8, 260/17 R, 260/29.6 TA, 260/884, 260/885, 260/899, 260/901, 260/80.71
[51] Int. Cl. .......C08f 29/18, C08f 45/24, C09d 3/74
[58] Field of Search.......260/29.6 T, 80.71, 29.6 TA, 260/DIG. 24

[56] References Cited

UNITED STATES PATENTS 3,012,018  12/1961  Marinelli et al........260/29.6 T
3,227,696  1/1966   Flowers et al. .........260/80.71
3,489,706  1/1970   Mikofalvy.............260/29.6 T Primary Examiner—William H. Short
Assistant Examiner—L. M. Phynes
Attorney—Wayne C. Jaeschke, Martin Goldwasser and Daniel S. Ortiz

[57] ABSTRACT

Aqueous emulsions or latices of fire retardant copolymers of: (1) vinyl chloride; (2) an alkyl acrylate or methacrylate and/or a vinylidene halide; and (3) bis(beta-chloroethyl) vinyl phosphonate and a method for their preparation are disclosed. These copolymer latices are described as being useful in a variety of applications including as coatings, adhesives and paint bases and also as additives for enhancing the fire retardancy of conventional latex polymer systems.

10 Claims, No Drawings

FIRE RETARDANT VINYL CHLORIDE COPOLYMER LATICES

BACKGROUND OF THE INVENTION

Copolymers of vinyl chloride are often prepared as aqueous latices in which form they may be conveniently used as coatings, adhesives, paint bases and in various other types of applications. In many instances, particularly where they are being considered for use in building interiors or in uses requiring their prolonged exposure to high temperatures, it is highly desirable and advantageous that these vinyl chloride copolymer latices should display enhanced fire or flame retardant properties so that they may either meet the standards set by various building codes or so that they may be safely employed in place of more costly materials.

Prior attempts to provide fire retardant, film forming vinyl chloride polymer latices have involved the preparation of various polymeric compositions including copolymer latices of vinyl chloride and the alkyl acrylate esters, copolymer latices of vinyl chloride and vinylidene chloride and polyvinyl chloride latices containing an extraneously added phosphate ester plasticizer. However, none of the latter approaches has proven to be completely satisfactory as the resulting products are found, in many cases, to be lacking sufficient fire retardancy, exceedingly soft, lacking in mechanical stability, readily degradable by ultra-violet radiation or subject to the gradual loss of their extraneously added phosphate plasticizers. In addition, it has in the past been difficult to prepare homogeneous copolymers of vinyl chloride and either the vinylidene halides or the alkyl acrylates and methacrylates because of the rather substantial differences in their reactivity ratios. This factor usually leads to the preparation of copolymers which contain substantially higher concentrations of the more rapidly reacting methacrylate and acrylate esters or of the vinylidene halides despite the fact that the original monomer charge may have contained a far higher proportion of the less reactive vinyl chloride.

Thus, it is the prime object of this invention to provide novel, fire retardant vinyl chloride copolymer latices which may be used in a variety of coating, binding, and laminating applications and which are characterized by their essentially complete freedom from the various disadvantageous properties heretofore associated with this type of product. A further object involves finding a means of preparing copolymers of vinyl chloride and the alkyl acrylates or methacrylates and/or the vinylidene halides which are homogeneous in their composition despite the substantial differences in the reactivity rates of vinyl chloride and the latter two classes of monomers. Various other objects and advantages of the invention will be apparent from a reading of the disclosure which follows hereinafter.

TECHNICAL DISCLOSURE OF THE INVENTION

It has now been found that excellent fire retardant vinyl chloride copolymer latices can be provided. These improved products comprise aqueous latices of 10–50:5–B90:5–50 vinyl chloride:bis(beta-chloroethyl) vinylphosphonate: $C_1$–$C_{12}$ alkyl acrylate or methacrylate esters and/or vinylidene halide terpolymers; the latter proportions being on a weight basis. These latices yield clear, non-burning, air drying films having good adhesive properties. Moreover these latices display excellent mechanical stability while the films derived therefrom are also noteworthy for their resistance to ultra-violet radiation. In addition, the presence of the bis(beta-chloroethyl) vinyl-phosphonate in the monomer mixture, wherein it serves as a unique reaction moderator, makes it possible to obtain uniform, homogeneous copolymers of vinyl chloride and the alkyl acrylates and methacrylates and/or the vinylidene halides by means of a "one-shot" polymerization process. Thus, such copolymers can not ordinarily be obtained in the absence of the bis(beta-chloroethyl) vinylphosphonate without resorting to the use of a so-called "slow addition" polymerization technique in which the alkyl acrylate or methacrylate ester or the vinylidene halide must be slowly added to the polymerization system throughout the course of the reaction.

The novel vinyl chloride copolymer latices of this invention may be prepared by means of free radical initiated emulsion polymerization processes well known to those skilled in the art. In these procedures, the various monomers and catalysts are emulsified, in water, by means of one or more surface-active emulsifiers whereupon the polymerization reaction is then initiated.

Suitable water soluble, free radical initiating catalysts for use in preparing the copolymer latices of this invention include sodium, potassium and ammonium persulfate and hydrogen peroxide or one may use a redox system such, for example, as a mixture of a persulfate with an alkali metal bisulfite, thiosulfate or hydrosulfite. These catalysts should be present in a concentration of from 0.1 to 5 percent, by weight, of the total monomer charge. With respect to the emulsifier or surfactant, it is possible to utilize one or more anionic, cationic, or non-ionic emulsifiers such, for example, as the alkyl carboxylic acid salts; the alkyl sulfate, sulfonate, phosphate, or sulfosuccinate salts; the alkyl aryl ether alcohols, and the alkyl aryl polyether sulfate salts. The selected emulsifier or emulsifiers should be present in a total concentration of from about 0.3 to 8 percent, by weight, of the total monomer charge. In addition, a protective colloid such as polyvinyl alcohol, methyl cellulose or gelatin can also, if desired, be present in the recipe in a concentration of from about 0.05 to 5 percent, by weight, of the total monomer charge.

The actual polymerization reaction will ordinarily be conducted at a temperature of from about 30° to 80° C. for a period of from about 6 to 24 hours, depending upon such factors as the particular monomer, catalysts, surfactants and polymerization apparatus that is being utilized. The latices resulting from this polymerization process will ordinarily have a resin solids content of from about 20 to 50 percent, by weight, wherein the particles range in size from about 0.02 to 2 microns.

It should also be noted that, if desired, the copolymers of this invention can be prepared in the form of aqueous suspensions having a particle size in the range of from about 10 to 300 microns. Such suspensions may be prepared by conducting the polymerization in an aqueous medium containing: (1) from about 0.05 to 2 percent, by weight, of the monomer charge, of a monomer soluble, free radical initiating catalyst such, for example, as benzoyl peroxide, lauryl peroxide or azo-bis-(isobutyronitrile) and (2) from about 0.05 to 5 percent, by weight of the monomer charge, of a suspension agent such, for example, as gelatin, poly(vinyl alcohol), methyl cellulose or poly(vinyl pyrrolidone).

As noted above, the copolymer latices of this invention can contain from about 10 to 50 percent, by weight of vinyl chloride; from about 5 to 90 percent, by weight, of bis(beta-chloroethyl) vinyl-phosphonate, hereinafter referred to as "bis-beta;" and from about 5 to 50 percent, by weight, of one or more $C_1$-$C_{12}$ alkyl acrylate or methacrylate esters and/or vinylidene halides. However, the preferred proportions for these copolymers are 25 to 40:30 to 60:20 to 40 vinyl chloride: bis-beta:$C_1$-$C_{12}$ alkyl acrylate or methacrylate ester and/or vinylidene halide with the optimum proportions being 30:50:20. In addition to bis-beta, it is also possible to employ various other bis(hydrocarbyl) vinyl phosphonates in preparing the copolymer latices of this invention. These applicable bis(hydrocarbyl) vinylphosphonates have the structure:

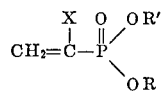

wherein X is selected from the group consisting of hydrogen, halogen, cyano, aryl such as phenyl, $C_1$-$C_{18}$ alkyl and

wherein R and R' are hydrocarbyl and substituted hydrocarbyl groups consisting essentially of hydrogen and carbon and containing up to about 18 carbon atoms inclusive with the proviso that R and R' may be the same, different or conjoint, i.e., R and R' may form one single radical.

The use, in this disclosure, of the expression "hydrocarbyl" and "substituted hydrocarbyl" groups refers to the radicals obtained upon the removal of a hydrogen from a hydrocarbon or substituted hydrocarbon group which may be either an aliphatic or aromatic group. These hydrocarbyl groups may be substituted with any non-interfering groups, i.e., with any group which does not interfere with the polymerization of the bis-(hydrocarbyl) vinylphosphonate. Such substituent groups include, for example, chloro, bromo, fluoro, nitro, hydroxy, sulfone, ethoxy, methoxy, nitrile, ether, ester and keto groups and the like.

Illustrative of such aliphatic groups as are represented by R and R' are alkyl groups, such as methyl, ethyl, propyl, butyl, pentyl, hexyl, nonyl, pentenyl and hexenyl groups and all of their respective isomers; cycloalkyl groups, such as cyclopropyl, cyclobutyl, cyclophenyl, cyclohexyl and cyclohexenyl groups and the like; while typical aryl groups represented by R and R' include phenyl, benzyl, phenethyl, tolyl and naphthyl groups and the like.

Representative of the above depicted bis(hydrocarbyl) vinylphosphonates which may be used in place of, or in addition to bis-beta in preparing the fire retardant vinyl chloride copolymer latices of this invention are:

Bis(beta-chloropropyl) vinylphosphonate;
Bis(beta-chloroethyl) 1-methylvinylphosphonate;
Bis(beta-chloroethyl) 1-cyanovinylphosphonate;
Bis(beta-chloroethyl) 1-chlorovinylphosphonate;
Bis(beta-chloroethyl) 1-phenylvinylphosphonate;
Dimethyl vinylphosphonate;
Diethyl vinylphosphonate;
Bis(omega-chlorobutyl) vinylphosphonate;
Di-n-butyl vinylphosphonate;
Di-isobutyl vinylphosphonate;
Bis(2-chloroisopropyl) 1-methylvinylphosphonate;
Diphenyl vinylphosphonate; and
Bis(2,3-dibromopropyl) vinylphosphonate.

It is, however, to be emphasized that it is preferred to employ bis-beta in preparing the vinyl chloride copolymer latices of this invention since the latter monomer is a commercially available material and lower in cost than any of the other above listed bis(hydrocarbyl) vinylphosphonates.

With respect to the $C_1$-$C_{12}$ alkyl acrylates and methacrylates, these can include for example, the methyl, ethyl, n-butyl, isobutyl, tert-butyl, hexyl, 2-ethyl hexyl, lauryl and isobornyl esters of acrylic and methacrylic acids. Suitable vinylidene halides include vinylidene chloride and vinylidene bromide with the use of vinylidene chloride being preferred. Thus, the copolymers of the invention may contain any one or more of these $C_1$-$C_{12}$ alkyl acrylates or methacrylates and/or vinylidene halides. However, optimum results are obtained by the use of either ethyl acrylate or vinylidene chloride. Thus, the preferred copolymer composition of this invention is a 30:50:20 vinyl chlorine:bis-beta:ethyl acrylate or vinylidene chloride terpolymer.

In addition to vinyl chloride, bis-beta and a $C_1$-$C_{12}$ alkyl acrylate or methacrylate and/or a vinylidene halide, the copolymers of this invention can also, if desired, contain one or more optional comonomers which may include acrylamide, N-methylol acrylamide, vinyl acetate, styrene, ethylene, propylene, 1-butene, vinyl bromide, acrylic and methacrylic acids. These optional comonomers may be present in the copolymers in a total concentration of from about 0.5 to 10 percent by weight.

The fire retardant vinyl chloride copolymers resulting from the above described process can be used in a variety of adhesive, coating, binding and laminating applications including, for example, as rug and carpet backing adhesives, as adhesives for fiberglass, as a backing coating for fabrics, as heat sealable binders for non-woven fabrics, as flooring, coatings, as paper coatings, as paint bases and as adhesives for preparing laminated structures. They can also be blended with aqueous latices of such polymers as the homo- and copolymers of vinyl acetate, styrene and the alkyl acrylates and methacrylates in order to enhance their flame retardancy characteristics.

The following examples will further illustrate the embodiment of this invention. In these examples, all parts given are by weight unless otherwise noted.

EXAMPLE I

This example illustrates the preparation of one of the novel copolymer latices of this invention which, in this case, is a 33:27:40 vinyl chloride:bis-beta:ethyl acrylate copolymer latex; the later proportions being on a weight basis.

The following ingredients are used in the preparation of this latex:

|  | Parts |
| --- | --- |
| Vinyl chloride | 50 |
| Bis-beta | 40 |
| Ethyl acrylate | 60 |
| Ammonium persulfate | 2 |
| The sodium salt of a $C_7$ alkyl sulfonate sold by E.I. duPont de Nemours as "Petrowet R" | 1.5 |
| Deionized water | 450 |

All of the reactants, with the exception of the vinyl chloride, are placed into a 32 oz. soda bottle. The bottle is then chilled and the vinyl chloride introduced whereupon the bottle is tumbled end-over-end, at 20 rpm, for 12 hrs. in a 50° C. water bath. After the completion of the polymerization reaction, the bottle is cooled to room temperature and uncapped. The absence of any residual gas indicates a very high conversion, of about 95 to 100 percent, of the vinyl chloride monomer. The resulting latex is filtered through cheese cloth in order to remove any gum and a small portion of the latex is then cast upon a glass plate and allowed to dry. Air drying for 24 hours yields a hard but flexible, tack-free film having a thickness of about 3 mils. This film exhibits clarity and has a Tg, i.e., a glass transition temperature, of +9° C. A small portion of this film is then extracted for 48 hours in boiling methanol. However, only about 2–4 percent, by weight, of this film sample is found to be extractable. This extractable fraction is determined to be a low molecular weight terpolymer thus indicating that the process of this invention yields copolymer products in a high degree of conversion.

The fire retardancy of this film is then quantitatively evaluated by determining its Limiting Oxygen Index (LOI) by means of the procedure described by Fenimore and Martin in the November, 1966, issue of Modern Plastics. In brief, this procedure directly relates flame retardancy to a measurement of the minimum percentage concentration of oxygen in a oxygen:nitrogen mixture which permits the sample to burn; the LOI being calculated as follows:

$$LOI = \frac{[O_2]}{[O_2]+[N_2]} \times 100$$

Thus, a higher LOI is indicative of a higher degree of flame retardancy. By means of this procedure, the film derived from the above described copolymer latex is found to have an LOI of 29.

EXAMPLE II

This example illustrates the preparation of another of the novel copolymer latices of this invention which, in this case is a 33:50:17 vinyl chloride:bis-beta:butyl acrylate copolymer latex; the latter proportions being on a weight basis.

The following ingredients are used in the preparation of this latex:

|  | Parts |
| --- | --- |
| Vinyl chloride | 50 |
| Bis-beta | 75 |
| Butyl acrylate | 25 |
| Ammonium persulfate | 2 |
| Sodium lauryl sulfate | 1 |
| Polyvinyl alcohol | 3 |
| Deionized water | 225 |

The same reaction procedures and conditions used in the polymerization procedure described in Example I, hereinabove, are employed in preparing this copolymer latex and a high conversion of vinyl chloride is again obtained. The resulting latex has a Tg of +7° C. and yields an air dried, cast film which is clear and tack-free although somewhat softer than the film derived from the latex of Example I. The LOI of this film is determined to be 34.

EXAMPLE III

This example illustrates the preparation of another of the novel copolymer latices of this invention which, in this case, is a 30:50:20 vinyl chloride:bis-beta:vinylidene chloride copolymer latex; the latter proportions being on a weight basis.

The following ingredients are used in the preparation of this latex:

|  | Parts |
| --- | --- |
| Vinyl chloride | 30 |
| Bis-beta | 50 |
| Vinylidene chloride | 20 |
| Potassium persulfate | 1.5 |
| Polyvinyl alcohol | 5.0 |
| "PETROWET R" | 1.5 |
| Deionized water | 300 |

The procedure of Example I is again followed in preparing this copolymer latex with the exception, in this instance, that the temperature of the reaction is maintained at 55° C. A high conversion of vinyl chloride is again obtained. The resulting latex has a Tg of +17° C. and yields an air dried, cast film which is clear and harder than the films derived from the latices of the copolymers of either Example I or II. Its LOI is determined to be about 55.

EXAMPLE IV

In U.S. Pat. No. 3,489,706 to Mikofalvy, there are disclosed aqueous latices of copolymers which preferably contain about 60–85 percent of an alkyl acrylate, 5 to 20 percent of an acrylic or methacrylic nitrile such as acrylonitrile and about 3 to 30 of bis-beta. These copolymer latices are described as having excellent resistance to solvents while maintaining desirably low glass transition temperatures.

However, because of the required presence of the acrylic or methacrylic nitrile in these copolymer latices, any attempt to introduce more than about 30 percent, by weight, of bis-beta therein has been found to result in the presence of a high concentration of unreacted, readily extractable bis-beta monomer in the resulting copolymer. This unreacted bis-beta will exude from the fabricated articles which are derived from such copolymer latices, thereby diminishing their effectiveness as fire retardant components while also ultimately resulting in the embrittlement of such products.

Moreover, films cast from the copolymer latices taught by Mikofalvy in which it is attempted to incorporate more than about 30 percent, by weight, of bis-beta are found to be exceedingly tacky as a result of the exudation of the unreacted bis-beta. And, of even greater significance is the fact that the required presence of a nitrile monomer and the limitation, as a result of the presence of the latter class of monomers, to the use of relatively low concentrations of bis-beta in the copolymers described in this patent combine to cause the films derived from these latices to be characterized by their poor fire retardancy properties. In contrast, the copolymers of this invention which require the presence, therein, of the chlorine atoms derived from their vinyl chloride moieties and which are also devoid of any nitrile monomer moieties will, as a result, have far superior flame retardant characteristics.

This fact is demonstrated by directly comparing a film specimen obtained from the copolymer latex whose preparation is described in Example I, hereinabove, with a 3 mil film specimen derived from a 65:15:20 ethyl acrylate:bis-beta:acrylonitrile copolymer latex whose preparation is described in Example I of the Mikofalvy patent. In affecting this comparison, 1 × 4 inch strips cut from each film specimen are suspended along their vertical axes and ignited, at their lower extremities, with the flame from a Bunsen burner fitted with a 1 inch wing top. Thus, it is observed that the film samples derived from the copolymer latex of this invention stop burning immediately upon removal of the externally applied flame and can thus be considered to be completely nonburning. In contrast, the films derived from the copolymer emulsion described in the patent continue to burn until entirely consumed. In addition, the films derived from the patentee's latex are found to have an LOI of 23 whereas, as previously noted, the films derived from the copolymer latex of Example I, hereinabove, have an LOI of 29.

EXAMPLE V

This example illustrates the preparation of another of the novel copolymer latices of this invention which, in this case, is a 33:50:17 vinyl chloride:bis-beta:2-ethylhexyl acrylate copolymer latex; the latter proportions being on a weight basis.

The following ingredients are used in the preparation of this latex:

| | Parts |
|---|---|
| Vinyl chloride | 50 |
| Bis-beta | 75 |
| 2-ethylhexyl acrylate | 25 |
| Ammonium persulfate | 3 |
| Sodium lauryl sulfate | 1 |
| Polyvinyl alcohol | 3 |
| deionized water | 225 |

The same reaction procedures and conditions used in the polymerization procedure described in Example I, hereinabove, are employed in preparing this copolymer latex and a high conversion of vinyl chloride is again obtained. The resulting latex has a Tg of +8° C. and yields an air dried, cast film which is clear and tack-free although somewhat softer than the film derived from the latex of Example I. The LOI of this film is determined to be 33.

Variations may be made in proportions, procedures and materials without departing from the scope of this invention as defined in the following claims.

What is claimed is:

1. An aqueous latex containing a fire retardant copolymer of a mixture consisting of 10 to 50: 5 to 90: 5 to 50 vinyl chloride:bis(beta-chloroethyl) vinylphosphonate: $C_1$–$C_{12}$ alkyl acrylate or methacrylate, the latter proportions being on a weight bases.

2. The latex of claim 1, wherein the proportions, by weight, of the monomer moieties in said copolymer are 25 to 40: 30 to 60: 20 to 40.

3. The latex of claim 1, wherein in said copolymer said alkyl acrylate is ethyl acrylate.

4. The latex of claim 1, wherein in said copolymer said alkyl acrylate is butyl acrylate.

5. The latex of claim 1, wherein in said copolymer said vinylidene halide is vinylidene chloride.

6. An aqueous latex containing a fire retardant copolymer of a mixture consisting of 10 to 50: 5 to 90: 5 to 50 vinyl chloride:bis(beta-chloroethyl) vinylphosphonate: $C_1$–$C_{12}$ alkyl acrylate or methacrylate or a fire resistant copolymer consisting of 10 to 50: 5 to 90: 5 to 50 vinyl chloride: bis(beta-chloroethyl) vinylphosphonate: and vinylidene chloride or vinylidene bromide.

7. An aqueous latex of a 30:50:20 vinyl chloride:bis-(beta-chloroethyl) vinylphosphonate:ethyl acrylate copolymer, according to claim 1.

8. An aqueous latex of a 30:50:20 vinyl chloride:bis-(beta-chloroethyl) vinylphosphonate:vinylidene chloride copolymer according to claim 1.

9. An aqueous latex containing a fire retardant copolymer of a mixture consisting of 10 to 50: 5 to 90: 5 to 50 vinyl chloride:bis(beta-chloroethyl) vinylphosphonate and vinylidene chloride or vinylidene bromide.

10. The latex of claim 6, wherein said mixture also contains from about 0.5 to 10 percent, by weight, of at least one optional comonomer selected from the group consisting of acrylamide, N-methylol acrylamide, vinyl acetate, styrene, ethylene, propylene, 1-butene, vinyl bromide, acrylic and methacrylic acids.

* * * * *

UNITED STATES PATENT OFFICE
CERTIFICATE OF CORRECTION

PO-1050
(5/69)

Patent No. 3,691,127      Dated September 12, 1972

Inventor(s) Paul Kraft and Robert H. Brunner

It is certified that error appears in the above-identified patent and that said Letters Patent are hereby corrected as shown below:

Example V, Column 8, line 4, "Ammonium persulfate - 3" should read -- Ammonium persulfate - 2 --.

In the Claims, Column 8, Claim 5, "The latex of claim 1" should read -- The latex of Claim 9 --.

In the Claims, Column 8, Claim 8, "according to Claim 1" should read -- according to claim 9 --.

Signed and sealed this 24th day of April 1973.

(SEAL)
Attest:

EDWARD M. FLETCHER, JR.
Attesting Officer

ROBERT GOTTSCHALK
Commissioner of Patents